United States Patent [19]

Hwang

[11] Patent Number: 4,541,876

[45] Date of Patent: Sep. 17, 1985

[54] NONAQUEOUS POWDERED METAL PASTE COMPOSITION

[75] Inventor: Jennie S. Hwang, Pepper Pike, Ohio

[73] Assignee: SCM Corporation, New York, N.Y.

[21] Appl. No.: 649,494

[22] Filed: Sep. 11, 1984

Related U.S. Application Data

[63] Continuation-in-part of Ser. No. 546,794, Oct. 31, 1983.

[51] Int. Cl.[4] .......................... B23K 35/34; C23R 1/12
[52] U.S. Cl. ........................................ 148/22; 148/23; 148/24; 148/25; 148/26
[58] Field of Search ........................ 148/22, 23, 24, 25, 148/26

[56] References Cited

U.S. PATENT DOCUMENTS

| | | | |
|---|---|---|---|
| 592,914 | 11/1897 | Knox | 148/25 |
| 608,973 | 8/1898 | Burnley | 148/25 |
| 804,664 | 11/1905 | Leisel | 148/24 |
| 851,813 | 4/1907 | Lanigan | 148/25 |
| 1,004,847 | 10/1911 | Brach | 148/24 |
| 1,772,952 | 8/1930 | Knoth | 148/24 |
| 2,330,904 | 10/1943 | Miller | 148/26 |
| 2,493,372 | 1/1950 | Williams | 148/24 |
| 3,065,538 | 11/1962 | Melchiors et al. | 148/24 |
| 3,073,270 | 1/1963 | Johnson et al. | 148/24 |
| 3,925,112 | 12/1975 | Petersen et al. | 148/25 |
| 3,954,494 | 5/1976 | Stayner et al. | 106/270 |
| 4,180,616 | 12/1979 | Lovering et al. | 148/24 |
| 4,273,593 | 6/1981 | Mastrangelo | 148/24 |
| 4,460,414 | 7/1984 | Hwang | 148/23 |

FOREIGN PATENT DOCUMENTS 1513203  1/1968  France .

OTHER PUBLICATIONS

"Technology of Electronic Grade Solder Paste", Taylor et al., Solid State Technology, Sep. 1981, pp. 127–135.

*Primary Examiner*—Veronica O'Keefe
*Attorney, Agent, or Firm*—R. A. Sturges; T. M. Schmitz

[57] ABSTRACT

There is provided a nonaqueous powdered metal paste composition and a vehicle therefor, characterized by resistance to slumping upon heating to the fusion point of the metal, fusion point being above 500° C., including the powdered metal, and an organic material having a surface tension of from 43 to 65 or higher dynes/cm. at 20° C.

18 Claims, No Drawings

NONAQUEOUS POWDERED METAL PASTE COMPOSITION

RELATED APPLICATION

This application is a continuation-in-part of my copending application Ser. No. 546,794 filed Oct. 31, 1983.

This invention relates to paste vehicle and a heat-fusible or sinterable metal powder. The vehicle is especially useful for making metalliferous pastes for joining infiltrating or facing metal work, or for a molding purpose.

BACKGROUND OF THE INVENTION AND PRIOR ART

The joining, infiltrating, or facing of metal work, or the manufacturing of many kinds of molded metal parts can be done efficiently (often with automation) using metalliferous powder-containing paste, provided, however, that upon heating and before fusion of the metal, the metal powder in the paste exhibits no significant hot slump (in other words, the powder stays substantially where the paste was deposited). This primary property has been difficult to obtain with conventional metal powder-containing paste. The instant vehicles and pastes can provide such property.

Restriction of flow of any resulting fused metal (that is a lack of general spreading about), except into intended joints or pores as in the joining of copper-based or iron-based metal parts, or in the infiltration of porous metal compacts such as steel compacts) is another property desired. The inventive products here can provide desired restriction of flow on fusion.

Brazing can be done with a paste of powdery powdered copper-based alloy or elemental copper-bearing, or with a cupreous so-called "silver solder". Facing applications, e.g., to coat, build-up or hard-face metal surfaces, can be done with pastes containing various metal or alloy powders, e.g., copper, copper-based, cobalt-based or nickel-based alloys, stainless steel, hard-facing alloys, etc. In hard facing, the metal powder usually is heated to a mushy state where liquid phase sintering of the metal occurs. Therefore, hard-facing powders can be considered here as essentially sinterable. Sometimes these pastes can contain particulate refractory materials such as alumina or silicon carbide for wear purposes. Infiltration of porous metal compacts, typically, steel compacts, call for fusion that will fill the pores of the compact with metal. Such pastes usually are copper-rich and contain a little iron, e.g., 0.01 to 6% by weight. Often a bit of refractory-providing material is used in them; the refractory material remains as a removable surface residue when the job is done. Molding applications, such as injection molding to make metal parts, can use a variety of metal powders in a paste vehicle. Most molded pastes here are formed of paste, then are heated to leave a sintered object. The vehicle weight proportion ordinarily is minor relative to that of the weight of fusible metal powder in most any of these foregoing pastes for efficiency and economy.

It has now been found that an improved vehicle for the instant pastes is provided by an essentially nonaqueous medium containing from 10–90 pbw hydrocarbon and a high surface tension nonaqueous organic liquid system. Such system provides an anti-slump property or slump control to the metal bearing paste such that when it is heated toward the melting point of the metal powder present, the shape of the deposit is substantially maintained. The hydrocarbon melts, of course, and wets the substrate around the deposit, but carries no significant amount of the metal particles with it. Apparently, the nonaqueous liquid system remains behind and provides a cohesive force for the powdered metal. Also, the hydrocarbon itself leaves no residue, is easily cleaned away from the joint or surrounding area. In the preferred compositions especially adapted for screen printing, no slump is observed. Surprisingly, even after melting, the fusible metal resists running from the site of application. The nonaqueous liquid system acts as an antislump agent. The compositions hereof are practically noncorrosive and easy to formulate and handle. They are readily adaptable to screen printing. Disadvantages attendant prior compositions, such as spattering due to evolution of water vapor, corrosivity, residue formation, etc., are not observed. The desirable properties of antislump and freedom from spattering in the metal—bearing pastes here is present and not in prior compositions known to me. Other additives are desirably present as will be pointed out below. The instant pastes have no water in them other than very minute amounts possible present as adventitious impurities that might be associated with good quality technical grade ingredients. No water is added deliberately as such, or as a hydrate, so it can be said that the instant pastes and vehicles are "nonaqueous" as a practical matter.

BRIEF STATEMENT OF THE INVENTION

Briefly stated, one aspect of the present invention is an improved paste containing from 60% to 90% parts by weight of a powdered metal or metal alloy powder or blend of powdered metals having a fusion point above 500° C., and having a particle size less than 20 mesh, and a vehicle, said vehicle being essentially nonaqueous and comprising a natural or synthetic hydrocarbon and a high surface tension, a nonaqueous organic liquid compound in a proportion effective for diminishing hot slump of the powder when it is compounded with said vehicle. The nonaqueous organic liquid is characterized in that it has a surface tension greater than 43 dynes/cm. at 20° C. Although any nonaqueous organic liquid having a surface tension at 20° C. greater than 43 dynes/cm. may be used herein, the most practical antislump agents are polyols and accordingly the invention will be described with particular reference to "polyols". The polyols useful herein contain from 2 to 6 hydroxyl groups and have a surface tension of from 43 to 65 or higher dynes/cm. at 20° C. No fluxing ingredient is required in these high melting point powdered metal (P/M) compositions although in certain instances, e.g., silver solder, such will be found useful.

To further extend the utility of these compositions there may be added one or more surfactants, one or more condensed or fused ring aliphatic acids, e.g., cholic acid or abietic acid or rosin acids, and one or more plasticizers such as di-n-butyl phthalate.

DETAILED DESCRIPTION OF THE INVENTION

It has been found that slumping of a paste composition containing a major amount of a hard or relatively high melting point metal or metal alloy powder or blend of powdered metals can effectively be prevented by a unique composition composed of a hydrocarbon or a mixture of hydrocarbons, e.g., petrolatum, or hydrogenated hydrocarbon polymers, and a high surface tension nonaqueous organic liquid material as above described. In brazing, infiltration, hard surfacing, etc., the completely melted melting point of the metal or metal alloy or powdered metal blend is generally above 500° C., and most usually above about 1000° C. Some of the lower melting materials, such as brazing silver solders have melting points between 500° C., and 800° C. The combination, however, of a hydrocarbon having a softening point of at least 15° C., and less than the melting point of the metal and a polyhydric alcohol, such as a di- or triethanolamine, or glycerine, or pentaerythritol, or the like, is, however, effective in maintaining quite substantially the profile of the paste as it was initially deposited on the surface or substrate. Thus, at the fusion point, the metal has not run or spattered or balled up into small discrete balls of molten metal prior to the fusion of the entire mass.

To form a powdered metal paste, the vehicles hereof are blended with a powdered metal or metal alloy or blend of powdered metals, preferably as spherical particles, to the extent of from 75% to about 95% metal by weight of the paste, and desirably from 80% to 90%, and preferably about 85% powdered metal. To some extent the amount of metal will depend on the use to which the paste is to be put. The particle size of the powdered metal is desirably such that it will not settle out of the vehicle, which may be quite viscous (20,000 to 200,000 cps., Brookfield No. 7 spindle at 20 rpm) on standing. In general for most applications, the particle size is less than 100 mesh (U.S. Standard Sieve Size), desirably $-150+400$ mesh, although $-20$ mesh material can be used. Typically a brazing (or "silver soldering") paste will contain about 65-75 pbw metal powder of $-150$ mesh size, an infiltration paste 80-90 pbw metal powder of $-100$ mesh size, a facing paste 60-90 pbw metal powder of $-100$ to $-200$ mesh size, and a molding paste (as for injection molding) 85-90 pbw of metal powder of $-400$ mesh size. In each case the balance of 100 pbw is made up with the vehicles hereof. A mixture of various sizes and/or shapes of the particles in the metal powders often is advantageous for achieving desired rheology and other paste properties in these applications.

Preparation of the vehicle and the metal-containing paste is achieved with conventional stirring or blending means. Warming can be done, if necessary or desired, to dissolve or melt organic ingredients together for putting them into very intimately dispersed condition and/or otherwise making a multiphase dispersion with the ingredients in a very fine state of subdivision preparatory to blending with the metalliferous powder to form a mass of paste consistency. Preferred compositions include an inorganic fluxing agent, optionally a surfactant, optionally an organic carboxylic acid, and optionally a diluent; i.e., a plasticizer and/or solvent. Each of these ingredients will be discussed below. Thereafter, the metals and metal alloys will be discussed followed by general processing techniques, and specific examples.

THE HYDROCARBON INGREDIENT

Hydrocarbons are preferred ingredients for the metal paste compositions hereof. Fluorinated hydrocarbons or chlorofluorinated hydrocarbons may be used to replace part or all of the hydrocarbon. The useful materials range in melting point from below about room temperature to normally solid materials, e.g., petroleum hydrocarbon waxes containing from 18 to 60 or more carbons and melting in the range of 28° C. to 100° C. The useful hydrocarbons also have a very low ash or solid residue content and either melt and flow, sublime and/or thermally decompose at a temperature below the melting point of the metal (i.e., below 500° C.). The amount of ash or solid residue from the hydrocarbon remaining of the melt temperature should be less than 0.5% and preferably less than 0.1%. The useful hydrocarbons may be paraffinic, aromatic, or mixed aromatic paraffinic or mixtures of compounds of such characteristics, and include various mixtures of hydrocarbons, e.g., octadecane, mineral spirits, paraffin wax, and petrolatum, e.g., Vaseline. Synthetic hydrocarbons normally solid or semi-solid include commercially available polyethylenes, polypropylenes, poly(ethylene-propylene), polybutenes, poly(ethylene-styrene); hydrogenated nonpolar polymeric hydrocarbons having Ring and Ball softening points of from 15° C. to 130° C., such polymers having a molecular weight less than about 1500 and preferably less than 1000, hydrogenated polyterpenes, etc. The best material known to me for use herein is petrolatum. Halogen substituted hydrocarbons, e.g., fluorocarbons and chlorofluoro carbons may also be used, they also being relatively inert at the temperatures encountered.

"Petrolatum" is a well known colloidal system of nonstraight-chain solid paraffinic hydrocarbons and high boiling liquid paraffinic hydrocarbons, in which most of the liquid hydrocarbons are held inside the micelles. A detailed historical account including the chemistry of petrolatum and modern manufacturing methods is found in Drug and Cosmetic Industry, Vo. 89, 36-37, 76, 78-80, and 82, July 1961. "Petrolatum for Drugs and Cosmetics" Schindler. Petrolatum is typically a yellowish to amber or white semisolid, unctuous mass, practically odorless and tasteless. It has a density at 25° C. of from 0.820 to 0.865, a melting point of 38° to 54° C., and a refractive index $\eta 60/0$ of 1.460–1.474. It is readily commercially available under the well known proprietary marks Vaseline, Cosmoline, Stanolene, Penreco brand petroleum jelly as well as other convenient trade designations. Petrolatum may be used in its commercially available form or it may be modified by the addition of petroleum wax or paraffin wax in particulate form, e.g., microcrystalline wax.

The hydrocarbon ingredient is utilized in an amount which ranges from 10 to 90 pbw of the vehicle system, or 0.7% to 22.5% of the powdered metal paste. A nonaqueous organic liquid having a surface energy in the range of 43 to 65 or higher dynes/cm appears to be essential for the slump control characteristics of the present powdered metal pastes. Although water has a high surface energy as does sulfuric acid, these materials are not satisfactory because of spattering or reactivity at elevated temperatures.

SLUMP CONTROL SYSTEM

As indicated above, the ability of a powdered metal paste to resist hot slump, or running during softening and melting is essential in various applications such as molding, casting, coating, silk and stencil screening, etc. It has been found that a combination of a hydrocarbon as above defined, and particularly petrolatum, and a nonaqueous organic liquid as above defined, and especially one or more polyhydric alcohols containing 2 to 6 OH groups and having a surface tension or energy of from 43 to 65 or higher dynes/cm. at 20° C., is effective in providing a good paste and in preventing slumping of the metal particles. The hydrocarbon alone with powdered soft solder composition appears incapable of conferring this property to any degree. Nonaqueous organic liquid gives sufficient antislump properties alone but often insufficient paste forming properties. The antislump agents hereof are generally polar compounds.

The polyols useful herein are aliphatic and normally liquid or of relatively low melting point, i.e., below about 170° C., and include ethylene glycol, diethylene glycol, propylene glycol, dipropylene glycol, sorbitol, mannitol, trimethylolethane, trimethylolpropane, diethanolamine, triethanolamine, pentaerythritol, and erythritol. These polyols coact with a hydrocarbon, especially petrolatum in the absence of water and in the presence of a finely divided metal powder to control slumping on heating and to provide a satisfactory paste medium. The polyol is generally insoluble in the hydrocarbon. The amount of liquid polyol constitutes from about 0.5% to 40% by weight of the vehicle and powdered solder metal composition.

A comparative study of various agents in 88.9% powdered metal compositions demonstrates the significance of the limitation respecting surface energy or surface tension.

The materials listed below are effective with the high melting metals (>500° C.) of this invention to control slump provided the surface tension in dynes/cm. at 20° C. is above 43.

TABLE I

| Surface Tension (Dynes/Cm.) | Antislump Agent | Slump Resistance |
| --- | --- | --- |
| 63.4 | 7% NaOH/93% Glycerine | Yes |
| 63.4 | Glycerine | Yes |
| 58.2 | Formamide | Yes |
| 55.1 | Conc. $H_2SO_4$ | Yes |
| 50.8 | Methylene Iodide | Yes |
| 48.4 | Triethanolamine | Yes |
| 48.5 | Diethanolamine | Yes |
| 48.3 | Monoethanolamine | Yes |
| 47.7 | Ethylene Glycol | Yes |
| 45.2 | Triethylene Glycol | Yes |
| 44.0 | Tetraethylene Glycol | Yes |
| 44.5 | Polyethylene Glycol 200 | Yes |
| 44.5 | Polyethylene Glycol 600 | Yes |
| 42.9 | Aniline | No |
| 40.9 | Phenol | No |
| 38.0 | Pyridine | No |
| 36.8 | Nitromethane | No |
| 32.7 | Acetic Anhydride | No |
| 32.5 | Oleic acid | No |
| 32.3 | Carbon Disulfide | No |
| 27.8 | Acetic acid | No |
| 27.5 | n-Octyl alcohol | No |
| 25.5 | Cyclohexane | No |
| 24.2 | Ethyl bromide | No |
| 23.0 | i-Butyl alcohol | No |
| 20.7 | t-Butyl alcohol | No |
| — | Vaseline | No |

Insofar as slumping of a powdered metal composition as it approaches fusion, the metal makes little or no difference and slump control is achieved with those materials having surface tensions above 43 dynes/cm. at 20° C. For practical purposes, I prefer the polyols, or mixtures of such polyols.

OTHER VEHICLE INGREDIENTS

It has been found that a surfactant may be advantageously included in the vehicles hereof. Although such surfactant or wetting agent may be anionic, cationic, amphoteric, or nonionic, nonionic ones are preferred. Many surfactant materials are known. They are used in the present vehicles to help to control the rheological properties, shelf-life stability, air voids, etc. The amount used is determined by cut and try and is that amount which is sufficient to impart the desired control. These agents assist in the dispersion of the powdered metal and in carrying the antislumping agent to the surfaces being joined or coated.

Specific surfactants include the alkylarylpolyether alcohols, ammonium perfluorinated carboxylates, fluorinated alkyl esters of fatty acids, acetylenic glycols (which as sometimes can act as a defoamer), polyoxyethylene sorbitan monostearate, etc. Surfactants commonly used in such metal-containing pastes, e.g., solder pastes, may be used herein.

Solvents and/or diluents may also be present in the vehicle compositions hereof. Solvent materials are desirably volatile, at least at the melting point of the metal or metal alloy. Any solvent including low molecular weight alcohols, e.g., ethyl or propyl, isopropyl, butyl, amyl, cyclohexyl, terpene alcohols, etc.; ketones, e.g., methyl ethyl ketone, methyl isobutyl ketone; 2-butoxyethanol-1, ethylene glycol dimethyl sulfoxide, hydrocarbons, e.g., kerosene, terpene hydrocarbons, hexane, cyclohexane, heptane, octane, naphthas such as mineral spirits, ethyl acetate, amyl acetate, etc. The solvent ingredients may also include higher boiling materials commonly regarded as plasticizers such as dibutyl phthalate, tricresyl phosphate, etc.

The selection of the solvent and/or diluent is controlled by the end use, cost, environmental factors, desired plasticity, etc.

Minor amounts of known odorants, bactericides, fungicides, etc., may also be included in the vehicles hereof if desired. Amounts of such ingredients usually range from about 0.1 to 2% by weight of the vehicle.

From time to time, it is desirable to include in the compositions of the present invention, particularly in the case of silver solder brazing pastes an inorganic fluxing agent such as a metallic halide, for example, zinc chloride, tin chloride, aluminum chloride, or ammonium chloride. Such an agent may be present in an amount ranging from about 0.5 to 5% by weight of the vehicle and is useful in cleaning the surface to be treated of the metal or metal alloy. Such oxidation, unless removed, destroys the integrity of the coating or juncture between the metals involved.

At the metal fusion temperatures encountered herein all organic ingredients are removed from the system either by volatilization or decomposition.

THE METAL POWDER

For making a paste, the metal powder is comminuted so that it is easily and stably dispersed in the vehicle by grinding, ball milling, paddle blending, ribbon blender, etc. The powder should pass through a 20 mesh screen (U.S. Sieve Series) (841 microns). Typically, the powder is finer than 100 mesh (149 microns) because larger particles are difficult to disperse and maintain in suspension in the paste. For most applications, a particle size in the range of −150+400 mesh (U.S. Sieve Series) is preferred. For most purposes, from 3 to 20 parts by weight of metal powder is blended with 1 part by weight of vehicle. I prefer to use spherically shaped particles, although irregular particles or flakes may be used. The paste compositions hereof generally will have a viscosity in the range of 20,000 cps to 200,000 cps., Brookfield No. 7 spindle at 20 rpm. The preferred apparent viscosity will depend on the method of dispensing or application of the paste to the materials to be joined. Hand trowelling pastes are more satisfactory at the higher apparent viscosities than pastes intended for automatic dispensing such as extruding, flowing or spraying, or those which are most suited for application by a screen printing process. Viscosity can be controlled easily by the amount of solvent or solvent mixture and/or plasticizer employed in the vehicle, or by the vehicle to powder ratio. Pastes often are degassed at reduced pressure.

Effective elimination of hot slump in metal-bearing pastes is demonstrated by the following specific examples. These examples are intended to enable those skilled in the art to apply the principles of this invention in practical embodiments, but are not intended to limit the scope of the invention. In this specification all temperatures are in degrees Celsius, all parts, percentages, and ratios are by weight unless otherwise expressly stated, and sieve sizes are for the U.S. Standard Sieve series.

PREPARATION OF THE VEHICLES

The simplest preparation of the vehicles hereof involves only effective mechanical mixing of the ingredients into the hydrocarbon. The hydrocarbon can, if desired, be heated sufficiently to melt it and facilitate the blending operation, and warming of some of the other ingredients also can be of help. It is not necessary that the mixture be a solution. The paste-like vehicle can be cloudy and contain two or more phases with the disperse phase fine enough so that it will not separate substantially on standing.

Testing for resistance to hot slump of a metal joining paste (brazing paste) was done by applying a deposit of the paste (about 5 mm diameter by 4-5 mm high) by spatula to a copper coupon, then gradually and automatically warming the coupon with a Browne Company reflow instrument (in effect an automated hot plate) from room temperature to 330° in about a half-minute to a minute. The heated deposit was visually for collapse of the metal prior to its fusing as the vehicle disappeared therefrom. Significant collapse of particulate metal of the deposit prior to its fusion would indicate hot slump.

In the examples the petrolatum indicated as Petrolatum A was Vaseline brand petroleum jelly, Vaseline being the trademark of Chesebrough Manufacturing Co., Inc., for USP petrolatum sold at retail for Household use. The other petrolatums used were Penreco USP petrolatums, Penreco being the trademark of Pennzoil Co.; Petrolatum B was their Regent grade white petrolatum (Melting Point 118°-130° F.); Petrolatum C was their Royal grade (Melting Point 118°-130° F.); and Petrolatum D was their Amber grade (Melting Point 122°-135° F.).

EXAMPLE I

Petrolatum A, 95 parts, was blended thoroughly with 5 parts of triethanolamine to make a vehicle for a brazing paste. 30 parts of such vehicle was thoroughly blended with 70 parts of elemental copper powder, the copper powder being −150 mesh, to make a soft paste. No significant hot slump was observed upon testing on a copper coupon with the reflow instrument.

A T-bar of an upright piece of steel temporarily wired to rest on and project from a horizontal flat piece of steel was made by applying the brazing paste deposit near one end of the interface between the pieces and heating the resulting assembly in a belt furnace. The assembly was maintained at 1121° C. for 10-20 minutes. The result was a good brazed joint between the pieces, with the brazing metal flowing into the joint by capillarity and exhibiting no appreciable spreading away from the joint.

EXAMPLE II

Petrolatum A, 95 parts, was blended thoroughly with 5 parts of a clear solution of 7 parts of sodium hydroxide in 93 parts of glycerine to make a vehicle for a brazing paste. 30 parts of such vehicle was thoroughly blended with 70 parts of elemental copper powder like that of Example I to make a soft paste. The paste was tested for hot slump and brazing effectiveness like the paste of Example I. No significant hot slump was observed. The resulting brazed joint was a good one, generally resembling that of Example I.

EXAMPLE III

The vehicle of Example I was used for making an infiltration paste. 20 parts of such vehicle was blended thoroughly with 80 parts of a powdered metalliferous infiltration composition to make a grainy paste.

To do this testing a coherent porous "green" (unsintered) compact of steel powder was coated approximately 6 mm thick all over with the paste. The metalliferous infiltration composition of the paste was a blend of elemental copper powder, a powdered copper-base alloy containing iron, a high green strength copper powder (SCM Corporation's HGS grade), silicon powder, and manganese powder; the infiltration composition had the following approximate net composition: 96.7% copper; 1.81% iron; 0.11% silicon; 0.32% zinc; and 1.00% manganese.

No hot slump of the deposit was observed upon testing with the Reflow instrument. The paste-coated compact was heated for three hours at 1232° C. to give a very efficient infiltration of the pores; 99% of the infiltration composition went into the compact, and only 1% residue was left; this easily brushed off from the surface of the resulting infiltrated and sintered compact.

EXAMPLE IV

The vehicle of Example II was used for making an infiltration paste. 20 parts of such vehicle was blended thoroughly with 80 parts of the powdered metalliferous infiltration compositions of Example III to make a grainy paste. The paste was tested for hot slump and infiltration effectiveness like the paste of Example III. No significant hot slump was observed. The infiltration of the compact was quite good, but did not reach the dramatically high efficiency obtained in Example III.

EXAMPLE V

A soft paste was made by blending thoroughly 20 parts of vehicle with 80 parts of −80 mesh 316 L stainless steel powder. The vehicle was 90 parts of Petrolatum A blended with 10 parts of a solution of 7 parts of sodium hydroxide dissolved in 93 parts of glycerine. The paste was extruded into a fused silica boat as a squat cylindrical shape with a small pointy peak rising about 5 mm. from a position central to the top (somewhat resembling the shape of the familiar milk chocolate "kiss"). The boat then was placed into the 600° F. zone of a small electrically heated tube furnace through which hydrogen gas was flowing. The boat then was moved about 2.5 cm towards the top temperature zone of the furnace at 4-minute intervals until about 20 cm was traversed, then was moved the remaining approximately 5 cm into the top temperature zone (about 1121° C.) and held there for 8 minutes. The boat was removed to a hydrogen-protected cooling zone of the tube for 12 minutes to cool the resulting coherent sintered porous metal part to room temperature. The main body of the part retained the original shape of the extrudate with no significant hot slump. Only the pointy peak of the "kiss" had blunted a bit and had drooped somewhat.

EXAMPLE VI

A vehicle for a powdered metal paste was made by thoroughly blending 75 parts by weight of petrolatum with 5 parts by weight of a clear solution of 7 parts NaOH in 93 parts of glycerine. 10 parts by weight of butyl carbitol were added to make the vehicle portion.

30 parts by weight of the foregoing vehicle was blended thoroughly with 70 parts of 316L—stainless steel powder −100 mesh size with 35–50% −325 mesh to form a soft paste.

The paste was tested for hot slump by application to a copper coupon and heating on a Browne Corporation reflow instrument at 330° C. No significant hot slump was observed.

EXAMPLE VII

A vehicle for powdered copper metal was made consisting of 82% petrolatum and 18% of a 7% NaOH—glycerine solution.

90 parts by weight copper shot (−20+80 mesh) was hand blended with 10 parts by weight of the vehicle. The resulting paste was applied to a vertical and a ~30° angled surface (steel) in a 1" circular and a 1" square preform shape. These panels were heated in a furnace.

The best furnace was run at 1800° F. for 30 minutes with 300 cubic feet per hour of dissociated ammonia gas.

Both forms sintered. The leading edges into the belt furnace oxidized and did not sinter. Both samples held their respective shapes. The leading edges and leading corners of the preforms set at a 30° angle slumped presumably when the vehicle vaporized.

Thus, the vehicle successfully held the shot together up to sintering temperature. Any slumping that occurred is attributed to the oxidized/unsintered leading loose shot edge.

EXAMPLE VIII

The present example illustrates the present invention with a hard surfacing paste.

The vehicle was formed in the manner indicated above (as for example in Example VI) by blending the following ingredients in the amounts indicated.

| Petrolatum | 65.0 parts |
| Triethanolamine | 25.0 parts |
| Cholic acid | 2.0 parts |
| Dibutylphthalate | 8.0 parts |

The powdered hard metal nickel alloy had the following elemental analysis:

| Carbon | 0.64% |
| Silicon | 4.24% |
| Chromium | 14.27% |
| Cobalt | 6.01% |
| Iron | 4.65% |
| Boron | 3.08% |
| Nickel | Balance |

The sieve analysis was:

| +115 mesh | 0.0% |
| +150 mesh | Trace |
| +200 mesh | 21.8% |
| +325 mesh | 56.3% |
| −325 mesh | 21.9% |

Ten parts by weight of the vehicle were thoroughly blended with 90 parts by weight of the hard metal powder. The resulting paste was applied to a steel bar:
(a) on a vertical face,
(b) on a flat angled surface (30°–45°) as
 (i) a circle 0.74"×0.125" thick
 (ii) a square 1"×1"×0.312" thick
(c) on a flat horizontal steel surface in the forms indicated in (b) above.

The preforms were then heated in a traveling belt furnace under the following conditions.
Belt speed: 1"/minute (~30 mins. in hot zone)
Preheat: 600° F.
Hot zone:
 (a) Run 1—1800° F.
 (b) Run 2—1900° F.
 (c) Run 3—2000° F.
Atmosphere: Dissociated ammonia.

RESULTS

Run 1: No melting, no apparent powder oxidation. All forms held their original shapes and approximate dimensions. Some cracks developed.

Run 2: Melting started on the vertical sample. No melting on all other samples which held their original shape and dimensions. Cracks developed where powder fell apart when the vehicle vaporized.

Run 3: Vertical sample melted and the angled sample began to melt, but held shape with some shrinkage. Vertical sample began to run downwards and brazed to steel bars together.

CONCLUSION

The vehicle restrained slumping and allowed the paste to retain its shape up to melting temperature of the alloy. Not all samples melted, possibly because of the large thermal mass of the steel bars.

EXAMPLE IX

This example is to test sinter a bronze part for application to the Anatoli Michaelson hollow core mold process using a thinner porous core mold using a bronze paste.

The paste was made in the manner illustrated in the preceding examples according to the following formulation:

| Copper Powder | 77 w/% |
| Tin Powder | 8.5 w/% |
| No slump Vehicle (Example VI) | 14.5 w/% |

The paste was hand applied to refractory shapes in a thickness ranging from 0.125 to 0.25". One refractory shape was a graphite triangle and the other an etched alumina rod.

The samples were placed on a thin alumina substrate on a belt furnace under the following conditions.

| Belt Speed | 1.5"/min. |
|---|---|
| Preheat | 600° F. (~10 mins.) |
| Hot Zone | 1540° F. (~15 mins.) |
| Atmosphere | Dissociated Ammonia |

The parts were sintered. When the graphite triangle (spacer) was cut in half, the bronze separated and showed good surface integrity. Slight slumping was observed.

It was indicated in this example that the sintering time and temperature were not optimal, but the concept worked.

The instant vehicles also are useful for so-called "functional" or "thick film" pastes for microelectronic circuit production. These pastes often contain very finely-divided noble or non-noble elemental metals and alloys and metal oxides such as those of ruthenium, lead, etc., to modify resistivity; glass-forming or ceramic-forming powder is a fundamental component of such pastes. They usually are screen-printed and fired on a substrate to obtain effective adhesion of the powdered components one to another and to a substrate.

The fired products are used as dielectrics, conductors, resistors, and capacitors. Their paths for conducting electricity need good line definition. Therefore, lack of significant hot slump and accompanying shape change and thickness change from the original paste deposit(s) is essential, and the inventive vehicles can provide that control.

Their firing profile (time and temperature) often is delicate and different for various compositions and substrates. Typically firing peak temperature, for example, with a platinum-silver alloy or palladium-gold alloy powder-containing paste on an alumina substrate to make a conductor will be 850°–950° C.; for sodalime glass substrate such peak is 550°–660° C.; for porcelain-enameled steel substrates such peak is 625°–675° C.

The metal or alloy powder in those special pastes usually is smaller than 10 microns in effective diameter, often being as fine as 2 microns or of submicron size. Normally such powder is spherical; sometimes it is in the form of flake. The powder components useful here can include pure gold, silver, copper, etc., as well as an alloy containing same, or can be all glass-formers or ceramic-forming compositions without elemental metal content. The vehicle for such paste is in minor proportion relative to that of the powdered components to be adhered together by the firing. Gold, platinum and palladium containing pastes usually are fired in air, while cooper-bearing ones are fired in a protective atmosphere such as nitrogen.

Without the necessary antislump systems of this invention, the hydrocarbon itself imparts no significant anti-hot slump or molten metal flow restriction effects to pastes containing subject metal powders. However, the presence of a relatively small proportion of an alkali particularly with a polyol and within the broad ranges hereinbefore described exerts substantially enhanced anti-hot slump effect and molten metal flow restriction effect than is exerted by the same antislump system without the alkali and used in a larger proportion within said broad ranges.

Accordingly, it should be evident that one skilled in the art of formulating metal powder-bearing pastes now has a way for controlling hot slump to a user's desired specification by formulating for diminishing such slump modestly or even clear down to practically zero; and for imparting, where necessary or desired, restriction flow of the molten metal anywhere from a modest desired proportion down to insignificance. The combination in the instant vehicle of petrolatum and the selected alkali (i.e., inorganic or organic base, or basically-reacting fluxing ingredients), as defined herein provides such control.

What is claimed is:

1. A nonaqueous powdered metal paste characterized by resistance to slumping during heating to the fusion point of the metal moiety of the paste comprising from 60 to 90 parts by weight of a powdered metal, powdered metal alloy or a blend of powdered metals having a melting point above 500° C. and having a particle size less than 20 mesh (U.S. Standard Sieve Size) and from 0 to 39 parts by weight of a natural or synthetic hydrocarbon having a melting point above 15° C. and below the fusion point of the metal or metal alloy powder, and from 0.5 to 40 parts by weight of a nonaqueous organic liquid compound having a surface tension of from 43 to 65 or higher dynes/cm. at 20° C.

2. A nonaqueous powdered metal paste as defined in claim 1 wherein the nonaqueous organic liquid compound is a polyhydric organic compound.

3. A nonaqueous paste as defined in claim 2 wherein the polyhydric organic compounds is a polyhydric alcohol.

4. A nonaqueous paste as defined in claim 2 wherein the polyhydric organic compound is selected from diethanolamine and triethanolamine.

5. A nonaqueous paste as defined in claim 2 additionally characterized by the presence therein of an alkali metal hydroxide.

6. A nonaqueous paste as defined in claim 3 additionally characterized by the presence therein of an alkali metal hydroxide.

7. A nonaqueous paste as defined in claim 5 wherein the alkali metal hydroxide is sodium hydroxide.

8. A nonaqueous paste as defined in claim 6 wherein the polyhydric alcohol is glycerine.

9. A nonaqueous paste as defined in claim 5 wherein the polyhdric organic compound is glycerine.

10. A nonaqueous paste as defined in claim 1 wherein the powdered metal paste is a brazing paste and the metal is copper.

11. A nonaqueous paste as defined in claim 1 wherein the metal alloy is a copper alloy.

12. A nonaqueous paste as defined in claim 11 wherein the copper alloy is copper/silver alloy.

13. A nonaqueous paste as defined in claim 11 wherein the copper alloy is copper/iron alloy.

14. A nonaqueous paste as defined in claim 1 wherein the powdered metal blend is a mixture of copper powder and tin powder.

15. A nonaqueous paste as defined in claim 1 wherein the metal alloy is a hard facing nickel alloy.

16. A nonaqueous paste as defined in claim 1 wherein the hydrocarbon is petrolatum.

17. A nonaqueous paste as defined in claim 1 wherein the hydrocarbon is a hydrogenated hydrocarbon polymer.

18. A nonaqueous paste as defined in claim 1 also containing a metal oxide or a ceramic forming powder.

* * * * *